E. P. COLEMAN.
VALVE STEM PACKING.
APPLICATION FILED JUNE 18, 1906.
906,199.
Patented Dec. 8, 1908.
3 SHEETS—SHEET 1.
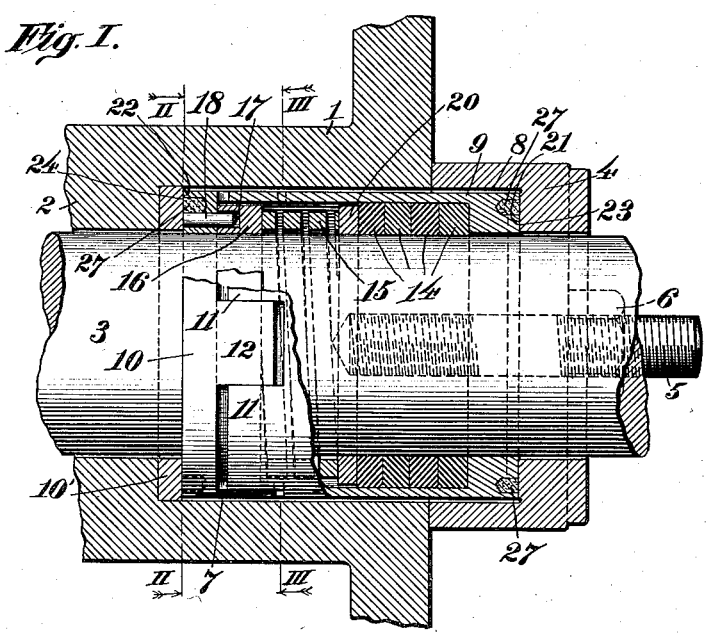
Fig. I.
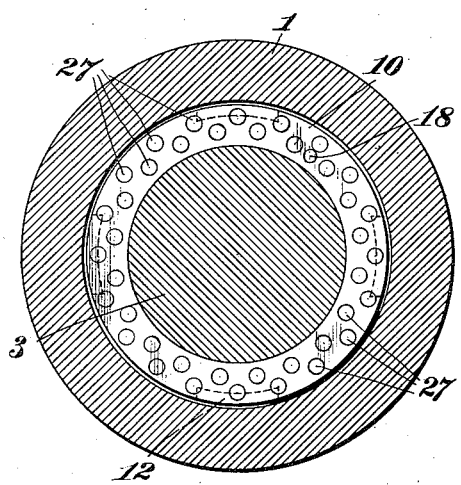
Fig. II.
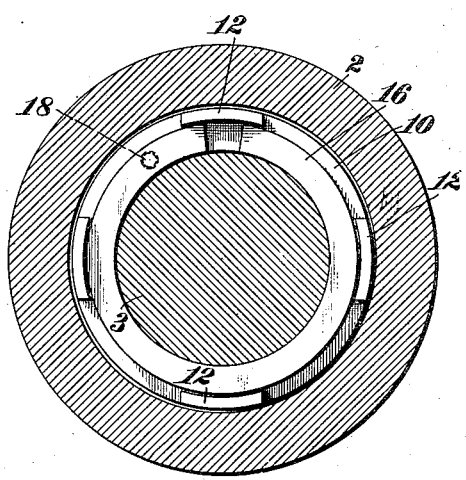
Fig. III.
Witnesses:
H. S. Austin
John R. Lefevre
Inventor
Edgar P. Coleman
by
Atty.

E. P. COLEMAN.
VALVE STEM PACKING.
APPLICATION FILED JUNE 18, 1906.
906,199.
Patented Dec. 8, 1908.
3 SHEETS—SHEET 2.
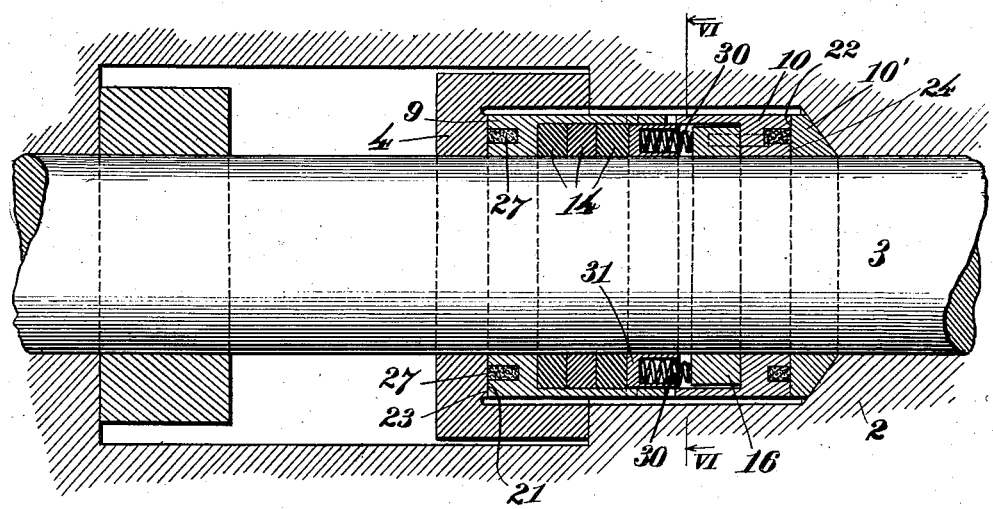
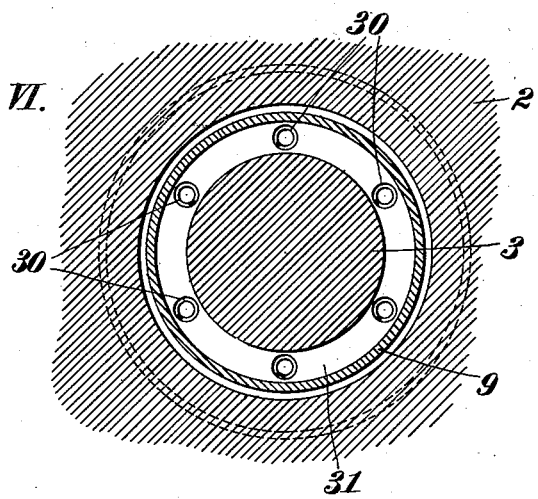
Witnesses:
Inventor
Edgar P. Coleman
By
Attorney E. P. COLEMAN.
VALVE STEM PACKING.
APPLICATION FILED JUNE 18, 1906.
906,199.
Patented Dec. 8, 1908.
3 SHEETS—SHEET 3.
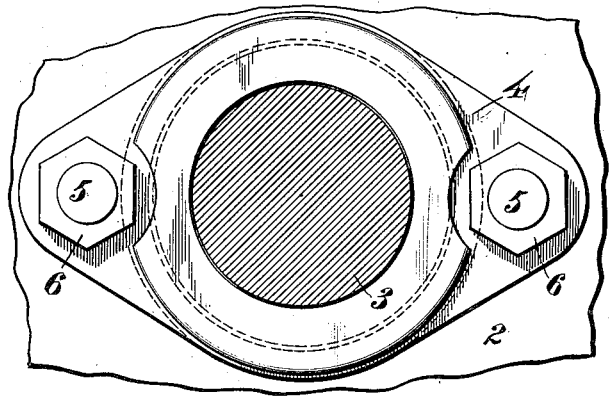
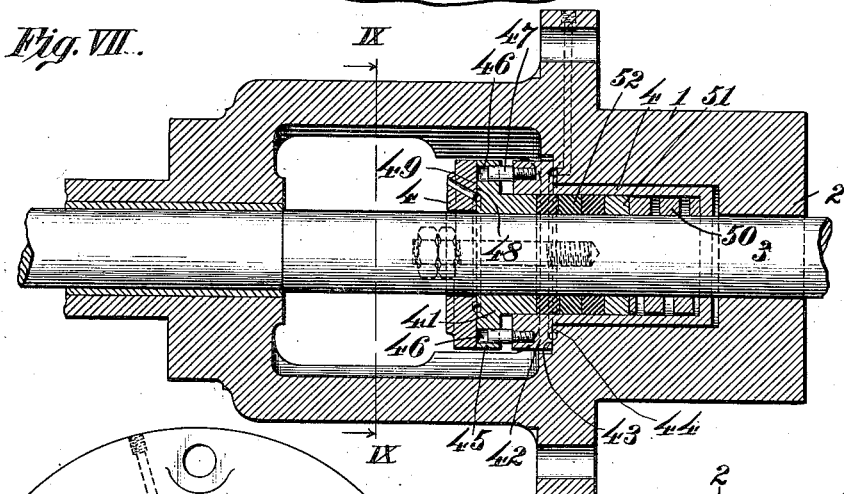
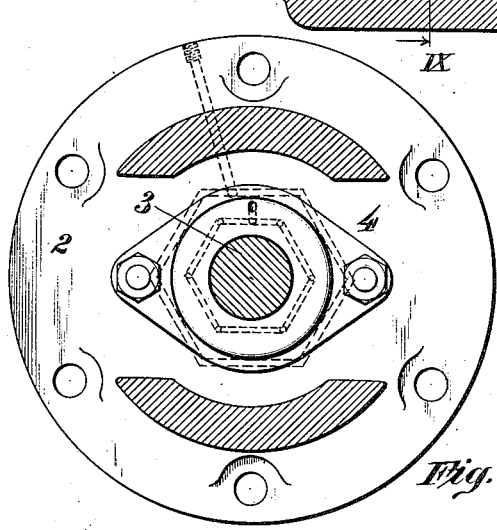
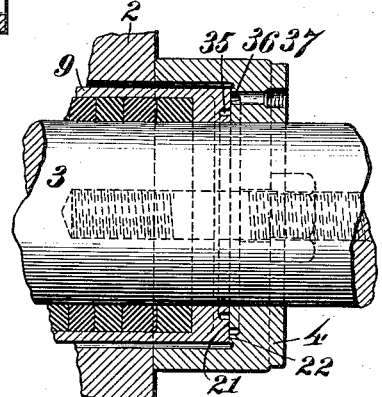
Witnesses:
Inventor:
Edgar P. Coleman
by
Atty.

UNITED STATES PATENT OFFICE.

EDGAR P. COLEMAN, OF BUFFALO, NEW YORK.

VALVE-STEM PACKING.

No. 906,199.   Specification of Letters Patent.   Patented Dec. 8, 1908.

Application filed June 18, 1906. Serial No. 322,292.

*To all whom it may concern:*

Be it known that I, EDGAR P. COLEMAN, a citizen of the United States, residing at the city of Buffalo, in the county of Erie and State of New York, have invented certain new and useful Improvements in Valve-Stem Packing, of which the following is a full, clear, and exact description, such as will enable others skilled in the art to which it appertains to make and use the same.

My invention relates to steam engines and has special reference to means for making tight the bearings of steam-valve stems and rods, particularly those which have a rotary or oscillatory motion, as in the Corliss type of engine.

In the ordinary valve stem packing, the soft packing is arranged about the valve stem in a stuffing box and held therein by means of a gland attached to said stuffing box. The packing thus arranged is stationary in respect to the steam chest while the rod rotates or oscillates with respect thereto. It is very difficult to keep such packing tight as it is constantly being loosened or dislodged by the oscillation and gyrating of the valve-stem, consequently steam often escapes around the valve stem, and furthermore air is frequently admitted to the exhaust ports of the engine. These defects materially reduce the efficiency of the engine.

The object of my invention is to provide a packing for valve stems, especially for those of a rotary or oscillatory type, of such construction and arrangement as will obviate both the leakage of steam about the valve stems, and the ingress of air to the exhaust ports.

The particular object of my invention is to provide a valve-stem packing wherein the soft packing will not become loosened or dislodged by the gyration of the valve stem.

A further object of my invention is to provide means for suitably lubricating the surfaces between the oscillatory members of the packing and the adjacent stationary parts.

My invention consists generally in a rotary valve stem packing, said packing comprising a longitudinally expansible stuffing box, rotatably fixed upon the valve stem and held between two stationary thrust surfaces and making suitable joints therewith; said stuffing box consisting in two substantially cylindrical members, so constructed and arranged as to provide a slidable joint between them; in soft packing in said stuffing box, and in a spring or springs, adapted to compress the soft packing, thereby maintaining a steam tight joint between the valve stem and stuffing box, and at the same time to longitudinally expand said stuffing box, thereby keeping the frictioned surfaces thereof in close contact with the contiguous faces of the adjacent stationary parts, which constitute the thrust surfaces.

It further consists in novel means for lubricating the joint between the stuffing box and the said thrust surfaces.

My invention further consists in other novel constructions and arrangements of parts all of which will be hereinafter described and particularly set forth in the claims.

My invention will be more readily understood by reference to the accompanying drawings and in which;

Figure I, is a longitudinal section of a valve stem packing and adjacent parts, embodying my invention; Fig. II, is a cross section on line II—II of Fig. I; Fig. III, is a cross section on line III—III of Fig. I; Fig. IV, is an end view of the device, the valve stem being shown in section; Fig. V, is a view similar to Fig. I, illustrating a modification of my invention, the same being illustrated as applied to a high pressure steam bonnet; Fig. VI, is a section on the line VI—VI of Fig. V; Fig. VII, is a detail sectional view illustrating a modification of the means for lubricating the bearing surfaces; Fig. VIII, is a further modification, the same being shown in longitudinal section; Fig. IX, is a section on line IX—IX of Fig. VIII.

Referring to Figs. I to IV of the drawings, 1, represents a stationary portion of the engine, more particularly a part of the steam chest, and 2, the bearing thereon for a valve stem, 3.

4, is a yoke surrounding the valve stem and affording a bearing for the outer end thereof. It is held securely to the face of the steam chest by bolts 5, provided with nuts, 6.

The contiguous faces of the steam chest, 1, and the yoke 4, are formed with cylindrical recesses 7 and 8 respectively, the two recesses together forming a casing for the accommodation of the stuffing box. The stuffing box comprises two cylindrical members 9 and 10 revolubly fixed, but longitudinally slidable in relation to each other. This slidable joint between the members 9 and 10 is formed by a plurality of interlocking lugs 11 and 12 upon the adjacent edges of the said members respectively, the lugs on each cylindrical member entering the recess between the lugs on the opposite member. By reference to Fig. I, it will be seen that any revolvular motion of one of the stuffing-box members, will impart a like motion to the other; however, the two members are free to move longitudinally independent of each other.

Within the member 9, I provide soft packing, 14. This packing is tightly compressed therein forming a steam tight joint between the member 9, of the stuffing box and the valve stem, 3. Being tightly wedged therein it practically binds the stuffing box to the valve stem; therefore each revolution or oscillation of the stem will impart a corresponding motion to the stuffing box. However, in this form of my invention I do not rely upon the wedging action of the packing to bind the stuffing box to the valve-stem.

16, indicates a spring or grip ring clamped by its own tension upon the valve stem, 3. It is provided with a hole or recess, 17, for the accommodation of a pintle, 18, projecting from the inner face of the member, 10. As the grip ring, 16, is securely clamped upon the valve stem, it is obvious that any movement of the stem will impart a like motion to the member, 10, and that this motion will be transmitted to the member, 9, through the medium of the lugs 11 and 12. This prevents any strain upon the soft packing wedged within the stuffing box, as would be the case was the packing alone relied upon to bind the stuffing box to the valve stem. A spring, 15, is interposed between this grip ring, and a follower or washer, 20, which serves to confine the soft packing, 14.

It will be seen from the foregoing, that the stuffing box will always rotate or oscillate with the valve stem, thus preventing any relative rotation between said stem and stuffing box. Therefore, after a steam tight joint is once made between the stem and stuffing box by means of the soft packing, 14, it will remain steam tight indefinitely. As ordinarily constructed, where there is relative movement between the stem and stuffing box, the constant wearing of the former upon the soft packing soon destroys the steam tight fit, and either allows steam to escape or air to enter the exhaust. However, when there is no relative movement between the stem and packing, there is consequently no wear upon said soft packing and therefore when once made tight, it will stay so for a long time.

It is obviously necessary to secure a steam tight joint between the rotary or oscillatory stuffing box and the contiguous stationary part of the engine, to prevent steam escaping or air entering around the stuffing box. Accordingly the end faces 21, 22, of the stuffing box and the contiguous faces 23, 24 respectively of the stationary parts, are tooled to a nice fit. The tension of the spring, 15, keeps the faces 21 and 23 in such close contact as to secure a perfectly steam tight joint between them. Between the member 10, and the bottom of the recess, 7, I provide a junk ring, 10′, to fill up the irregular end of the cavity, 7.

To lubricate the frictional surfaces 21, 23 and 23, 24, I provide the faces 21 and 22 with a plurality of recesses for the accommodation of a like number of graphite pencils, 27. These pencils are preferably arranged in a double or staggered row as shown in Fig. II. The outer ends of these pencils being at all times in contact with the opposite frictional or thrust surfaces, any rotation or oscillation of the stuffing box tends to evenly distribute the graphite in small but sufficient quantities over the frictional surfaces.

In Figs. V and VI, I illustrate a modification of my invention, the same being shown as applied to a high-pressure steam-bonnet. This modification differs from the above form principally in that the spring, 15, is replaced by a plurality of small helical springs, 30. I have found that under some conditions a number of springs, so arranged, is better adapted to maintain a steam tight joint between the stuffing box and thrust surfaces, than one larger spring is capable of doing. The other points of difference between this and the preceding form are merely in such details of construction as will facilitate the assembling of the device. With this object in view, the ring, 20, is replaced by a deeper one, forming a spring cage, 31; and the cylindrical member 10, is made somewhat deeper than in the preceding form. The ring interposed between the member 10, and the stationary part of the engine, may be made conical or with a spherical bearing face, the better to adapt itself to the gyrations of the valve stem and at the same time maintain a tight joint.

In Fig. VIII, I illustrate a further modification of my invention, in so far as the lubricating means is concerned. In this modification I provide the contiguous frictional faces with similar polygonal oil grooves 35 and 36. Oil introduced to the groove 36 through the oil hole, 37, is fed to the groove 35 and the frictional surfaces with each oscillation of the stem.

Figs. VIII and IX illustrate a still further modification. In this form of my invention, the stuffing box comprises two telescopic cylindrical members, 40, 41. The member, 40, is a hollow cylinder, closed at the inner end, except for an aperture left for the accommodation of the valve stem, 3.

At its outer end it is provided with an annular flange, 42, the inner face, 43, of which is suitably finished to form a steam tight joint with a thrust surface, 44, upon the stationary part, 1. The member 41, is preferably solid, save where it is bored for the accommodation of the valve-stem, 3. It is also provided with an annular flange, 45, having one or more holes, 46, to receive dowels or pins 47, projecting from the outer face of the flange, 42. The outer face of the member, 41, is finished to provide a smooth surface, 48, to bear against the thrust surface, 49, formed upon the inner face of the yoke, 4.

A spring 50, is interposed between the inner end of the member, 40, and a follower ring or washer, 51. This spring keeps the soft packing, 52, contained in the cylindrical member, 40, well compressed, forming a steam tight joint between the stem 3 and stuffing box. The tension of the spring, 51, also keeps the bearing surfaces 43 and 48 of the stuffing box in close contact with the thrust surfaces 44 and 49; thereby maintaining a steam tight joint between the rim 42, of the stuffing box and the steam bonnet.

The bearing surfaces 43, 44 and 48, 49 are to be suitably lubricated and to this end either of the aforementioned methods may be used. I have illustrated the surfaces as provided with oil grooves such as shown and described in connection with Fig. VII of the drawings. However, I may provide them with the graphite lubrication as illustrated in Figs. I and II.

It is obvious that numerous modifications of my invention may be made by anyone skilled in the art, without departing from the scope of my invention; therefore I do not confine myself to the specific constructions and arrangements of parts as illustrated in the drawings and hereinafter described.

Having thus described my invention, I claim as new and desire to secure by Letters Patent:

1. In a valve stem packing, a rotary valve stem, in combination with its bearing, a longitudinally expansible stuffing box, a member holding said box against rotation on said stem, packing in said box, a spring in said boxes between said packing and one member or end of the box and means closing the joint between said box and said bearing, substantially as described.

2. In a valve stem packing, a valve stem, a steam bonnet, bearings therein for said valve stem, a yoke attached to said steam bonnet, and thrust surfaces upon said steam bonnet and yoke respectively, in combination with a longitudinally expansible stuffing box, rotatably fixed upon said valve stem, suitable bearing surfaces upon said stuffing box for engagement with said thrust surfaces, packing in said stuffing box and a spring or springs arranged in said box and adapted to compress said packing against one end thereof and the valve stem and also adapted to expand said stuffing box against said thrust surfaces, substantially as described.

3. In a valve stem packing, a valve stem, bearings for said stem, and thrust surfaces upon said bearings, in combination with a longitudinally expansible stuffing box held between said thrust bearings, a ring rotatably securing said stuffing box upon said stem, packing in said box and a spring arranged between said ring and said packing to compress the packing upon the stem and expand said box against said thrust surfaces, substantially as described.

4. In a valve stem packing, a valve stem, bearings for said valve stem and thrust surfaces upon said bearings, in combination with a longitudinally expansible stuffing box containing packing material and held between said thrust surfaces, a member rotatably securing said stuffing box upon said valve stem, and means located within said stuffing box adapted to longitudinally expand said stuffing box, and compress said packing substantially as and for the purpose described.

5. A valve stem and its bearing, in combination with a two part stuffing box provided on said stem and adapted for rotation therewith, compressible packing arranged between the parts of the rotatable box, a spring also arranged between said parts and acting upon said packing to compress the same in the end of the box and upon said stem and means closing the joint between said box and said bearing, substantially as described.

6. A valve stem and its bearing, in combination with an expansible packing box arranged on said stem, means securing the box to the stem for rotation therewith, soft packing provided in said box, means closing the joint between the box and the bearing and a spring also in said box and acting to compress said packing and force the end of the box against said bearing, substantially as described.

7. In a valve stem packing, a valve stem, a longitudinally expansible stuffing box upon said valve stem, said stuffing box comprising two substantially cylindrical members rotatably fixed but slidably movable in relation to each other, means for rotatably securing one of said cylindrical members upon the valve stem, and bearing surfaces upon the exterior of each said cylindrical member, in combination with a steam bonnet and yoke, thrust surfaces upon said bonnet and yoke adapted to be engaged by the bearing surfaces on said cylindrical members, packing within the stuffing box and a spring or springs within said stuffing box adapted to compress said packing and expand said stuffing box to maintain a tight joint between said thrust surfaces and said bearing surfaces respectively, substantially as and for the purpose described.

8. In a valve stem packing, a valve stem, a longitudinally expansible stuffing box upon said valve stem, said stuffing box comprising two substantially cylindrical members rotatably fixed, but slidably movable in relation to each other, means for rotatably securing one of said cylindrical members upon the valve stem and bearing surfaces upon the exterior of each said cylindrical member, in combination with a steam bonnet and yoke, thrust surfaces upon said bonnet and yoke adapted to be engaged by the bearing surfaces of said cylindrical members, packing within the stuffing box, a spring or springs within said stuffing box adapted to compress said packing and expand said stuffing box to maintain a tight joint between said thrust surfaces and said bearing surfaces respectively and means for lubricating the joints between said surfaces, substantially as and for the purpose described.

9. A valve stem packing comprising a valve stem and its bearing, in combination with a longitudinally expansible stuffing box arranged upon the bearing, a member securing the stuffing box upon the stem for rotation therewith, a packing within the box, a spring for at once compressing the packing and expanding the box, thrust surfaces upon said bearing and the box provided with pits and graphite filling said pits, substantially as described.

10. A valve stem packing comprising a rotary valve stem and its bearing, in combination with a member fastened on said valve stem, means closing the joint between said member and said bearing, soft packing engaged with said member and closing the joint between the same and the valve stem and a spring also rotatable with the valve stem and acting upon said packing and said member to keep both joints tight, substantially as described.

In testimony whereof, I have hereunto set my hand, this 12th day of March, 1906, in the presence of two subscribing witnesses.

E. P. COLEMAN.

Witnesses:
M. SIMON,
H. S. AUSTIN.